United States Patent [19]
Hoopman et al.

[11] Patent Number: 5,519,539
[45] Date of Patent: May 21, 1996

[54] MICROLENS ARRAY WITH MICROLENSES HAVING MODIFIED POLYGON PERIMETERS

[75] Inventors: Timothy L. Hoopman, River Falls, Wis.; David J. W. Aastuen, Farmington, Minn.

[73] Assignee: Minnesota Mining and Manufacturing Company, St. Paul, Minn.

[21] Appl. No.: 151,524

[22] Filed: Nov. 12, 1993

Related U.S. Application Data

[62] Division of Ser. No. 967,453, Oct. 28, 1992, Pat. No. 5,300,263.

[51] Int. Cl.⁶ .............................. G02B 27/00; G02B 3/02
[52] U.S. Cl. ...................... 359/741; 359/619; 359/620; 359/625; 359/628
[58] Field of Search ..................... 359/741, 742, 359/642, 619, 620, 625, 628

[56] References Cited

U.S. PATENT DOCUMENTS

| | | | |
|---|---|---|---|
| 2,854,337 | 9/1958 | Pearson | 96/38 |
| 3,748,724 | 7/1973 | Beasley | 29/558 |
| 4,129,628 | 12/1978 | Tamutus | 264/1 |
| 4,243,618 | 1/1981 | Van Arnam | 264/1 |
| 4,478,769 | 10/1984 | Pricone et al. | 264/1.6 |
| 4,528,260 | 7/1985 | Kane | 430/321 |

FOREIGN PATENT DOCUMENTS

| | | |
|---|---|---|
| 0011331A1 | 5/1980 | European Pat. Off. . |
| 0426441A2 | 5/1991 | European Pat. Off. . |
| 0450780A2 | 10/1991 | European Pat. Off. . |
| 58-29628 | 2/1983 | Japan . |
| WO92/08998 | 5/1992 | WIPO . |

OTHER PUBLICATIONS

"Microlens Arrays for Solar Astrometry" by Guy Artzner, *Microlens Arrays*, M. C. Hutley, editor, May 1, 1991, pp. 91–96.

"Fabrication and Testing of Monolithic Lenslet Module (MLM) Arrays," by D. D'Amato et al., *Optical Fabrication and Testing*, 1990 Technical Digest Series, vol. 11, Optical Society of America, Jun. 12, 1990.

"Micro–Optics: Monolithic Lenslet Modules" sales brochure from United Technologies Adaptive Optics Assoc., Cambridge, MA, Jun. 1992.

*Primary Examiner*—Scott J. Sugarman
*Attorney, Agent, or Firm*—Gary L. Griswold; Walter N. Kirn; Eric D. Levinson

[57] ABSTRACT

A microlens array and mold for making same in which the perimeter of each microlens is a modified polygon in that each edge of the lens approximates an elliptical arc, the ends of which terminate at the corners of the polygon, wherein the middle of the arc curves toward the center of each microlens. The microlenses are preferably rectangular or triangular.

8 Claims, 4 Drawing Sheets

5,519,539

MICROLENS ARRAY WITH MICROLENSES HAVING MODIFIED POLYGON PERIMETERS

This is a division of application Ser. No. 07/967,453 filed Oct. 28, 1992, now U.S. Pat. No. 5,300,263.

FIELD OF THE INVENTION

The present invention relates to an improved method for making microlens arrays and microlens array molds, and the articles made therefrom.

BACKGROUND OF THE INVENTION

A microlens array is a group of generally spherical lenses arranged two-dimensionally having a center to center spacing of less than about 2 mm. Microlens arrays have various uses as described in European Patent Application 0,426,441 A2, including: (1) to intensify luminance by focusing light in areas around picture elements in non-luminant display devices such as liquid crystal display devices; (2) as a light pick-up means such as a laser disc, compact disc, or optical magnetic disc; (3) as a focusing means for coupling a luminant device or a receptive device to an optical fiber; (4) as a focusing means or an image forming means for focusing incident light in a photoelectric converting zone so as to increase the sensitivity of a primary image sensor used in a solid state image device such as a charge couple device (CCD) or facsimile machine; (5) as an image forming means for forming an image on a sensitive medium to be printed on by a liquid crystal printer or an LED printer; and (6) as a filter for treating photo-information.

Microlens arrays can include hundreds, thousands, and even a million or more microlenses. For example, an array of microlenses having dimensions of 12.5 cm by 18.75 cm and consisting of microlenses having a center to center spacing of 0.25 mm would require the creation of 375,000 microlenses. The cost of fabricating so many microlenses according to known methods can be prohibitive. It would take literally hundreds of hours to machine the 375,000 concave cavities required to produce a mold capable of making the microlens array. Furthermore, any mistake made during the machining process might require a restart.

It would be desirable to have a method of making an array of microlenses which was faster and less expensive than currently known methods.

SUMMARY OF THE INVENTION

The present invention further includes an array of spherical microlenses, and a mold for forming such an array, wherein the perimeter of each of the microlenses is a modified polygon in that every edge of the lens is an elliptical arc, the ends of which terminate at the corners of the polygon, wherein the middle of the arc curves toward the center of the microlens. These microlenses are preferably in the shapes of triangles or rectangles.

BRIEF DESCRIPTION OF THE DRAWINGS

The present invention will be further described with reference to the accompanying drawings wherein like reference numerals refer to like parts in the several views, and wherein.

DETAILED DESCRIPTION

Figure 1:
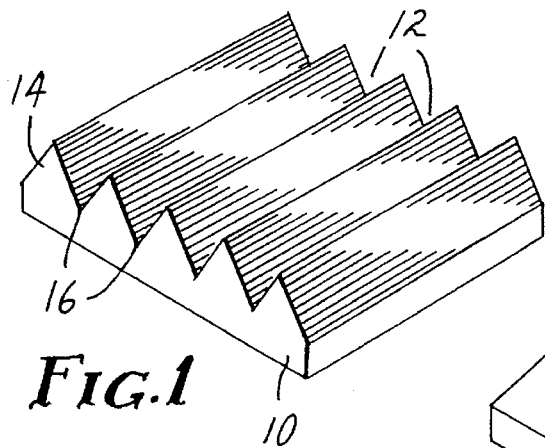
FIG. 1 is a perspective view of a substrate having a first plurality of parallel grooves according to one embodiment of the invention.

A substrate 10 is shown in FIG. 1. A plurality of grooves 12 have been cut in the substrate 10 by a machining process, such as diamond turning, forming a plurality of triangular ridges 14. The grooves 12 are preferably, although not necessarily, straight and parallel to each other. The grooves 12 of FIG. 1 are located immediately adjacent each other and are V-shaped, having sharp bottoms 16. Other groove shapes are possible, see e.g., FIGS. 7 and 10, and these will be discussed later. The substrate 10 is preferably comprised of any material that is susceptible to the diamond turning process, and is preferably hard copper, although an acrylic or other engineering polymer could also be used.

Figure 2:
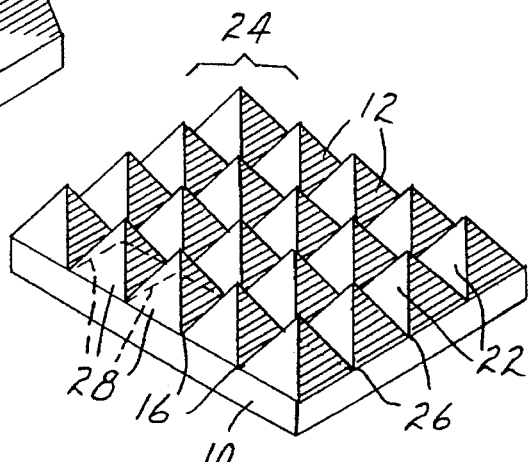
FIG. 2 is a perspective view of the substrate shown in FIG. 1 having a second plurality of parallel grooves intersecting the first plurality of grooves.

A second plurality of grooves 22 is then similarly machined into the substrate 10, as shown in FIG. 2, forming a plurality of pyramidal protrusions 24. The grooves 22 should be cut to the same depth as the grooves 12. As in the case of the grooves 12, the grooves 22 are preferably, although not necessarily, straight and parallel to each other. And as in the case of the grooves 12, the grooves 22 are located immediately adjacent each other and have sharp bottoms 26. Other groove shapes are possible.

If the grooves 12 are straight and parallel to each other, and if the grooves 22 are straight and parallel to each other, and if the grooves 12 are also perpendicular to the grooves 22, they will create pyramidal protrusions 24 having rectangular bases 28, as shown in FIG. 2. But if the parallel grooves 22 are not perpendicular to the parallel grooves 12, then the bases 28 of the protrusions 24 would be parallelogram-shaped.

The distance between adjacent straight, parallel grooves 12 need not be equal to the distance between adjacent straight, parallel grooves 22. If the two distances are equal, however, then the pyramidal protrusions 24 will have square bases 28 if the two sets of grooves are perpendicular to each other, and rhomboid bases if they are not.

Figure 3:
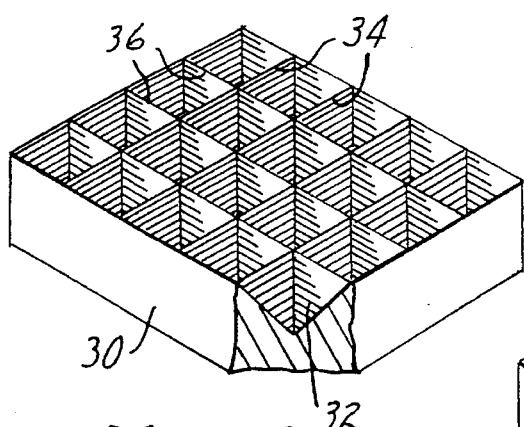
FIG. 3 is a perspective view of a negative replica of the substrate shown in FIG. 2 according to the present invention.

A negative replica of the surface of the substrate 10 having the two sets of parallel grooves 12 and 22 is then produced, preferably by electroforming, thereby creating a negative replica 30, as shown in FIG. 3. The replica 30 has a plurality of pyramidal receptacles 32 which correspond to the pyramidal protrusions 24 of FIG. 2. The receptacles 32 can have rectangular apertures and are separated by walls 34 and 36, which correspond to the grooves 12 and 22, respectively, of FIG. 2. The tops of the walls 34 and 36 are co-planar.

The receptacles 32 may be formed by other known methods, such as photolithography or knurling.

Figure 4:
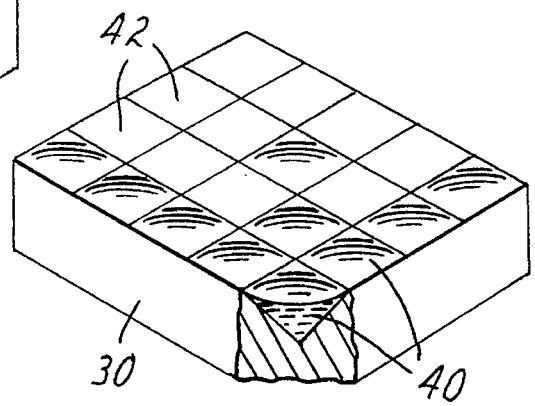
FIG. 4 is a perspective view having parts thereof broken away and in section of the replica shown in FIG. 3 covered with a hardened liquid according to the present invention.

A hardenable liquid 40 is then applied to the surface of the replica 30 having the pyramidal receptacles 32, as shown in FIG. 4. The volume of liquid 40 which enters the receptacles 32 can be controlled by sliding a squeegee across the surface of the replica 30. The liquid 40 can also be applied by other known coating techniques, such as by the use of roller. The receptacles 32 should be partially filled, thereby forming a slight meniscus 42 in each receptacle.

The shape of the meniscus 42 will be determined by the physical properties of the liquid 40 and the coating conditions. If the liquid 40 is a 100% solids, non-shrinking, curable material, then the shape of the hardened liquid will remain the same as that of the meniscus 42. However, if the liquid 40 shrinks as it hardens, then the liquid will contract, creating a concave surface having a smaller radius of curvature than that of the meniscus 42.

Preferred materials for the hardenable liquid 40 include materials which shrink by at least 5%, and preferably about 20%, during hardening. In the alternative, a non-shrinkable resin can be made shrinkable by diluting the resin. This diluted mixture would then shrink during drying. A diluted non-shrinkable resin behaves differently from a shrinkable resin in that the diluted non-shrinkable resin remains a flowable liquid throughout the volume reduction process, while a shrinkable resin becomes increasingly less flowable during the hardening process because its viscosity is continually increasing. Diluted resins which flow during the volume reduction process are desirable because the shape of the concave surface caused by the meniscus will be relatively unaffected by the shape of the receptacle. A shrinkable resin may be selected if increased conformance to the shape of the receptacle is desired. Preferred materials for the hardenable liquid 40 include radiation curable resins, such as methacrylates, acrylates, urethane acrylates, epoxies, esters and polyester acrylates, and thermoplastics and thermosetting resins.

It is possible to make an array of convex microlenses by applying a liquid lens material (not shown) to the surface of the hardened-liquid-covered replica 30. However, the hardened-liquid 40 may not be totally compatible with the lens material. Furthermore, repeated applications of lens material to the surface in order to make additional microlens arrays can lead to degradation of the surface of the hardened liquid, resulting in the production of imperfect lenses. Thus, it is usually desirable to replicate the hardened-liquid-covered replica 30 in a harder material such as nickel, which is also compatible with most lens materials.

The replica 30 can be replicated in nickel by first metalizing the hardened-liquid-covered surface of the replica to make it electrically conductive. This can be done by depositing a layer of electroless silver (not shown) on the surface of the replica 30 by the use of a chemical reduction process.

Figure 5:
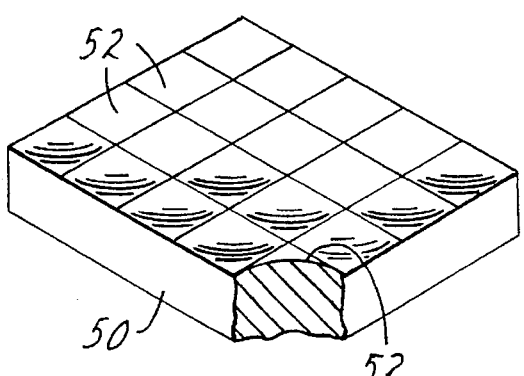
FIG. 5 is a perspective view having parts thereof broken away and in section of an electroformed nickel negative of the hardened-liquid-covered replica shown in FIG. 4 according to the present invention.

The metalized replica 30 can be electroformed to create a nickel negative 50 of the replica, shown in FIG. 5. The nickel negative 50 has a plurality of convex surfaces 52 corresponding to the hardened concave surfaces resulting from menisci 42 in FIG. 4.

Figure 6:
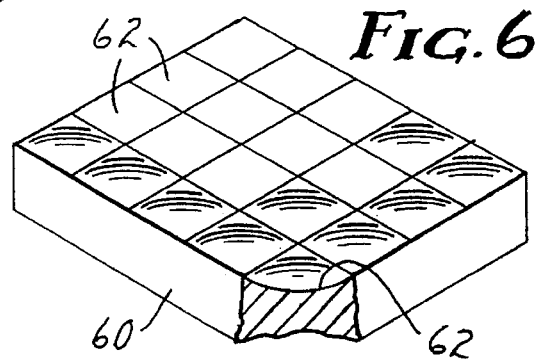
FIG. 6 is a perspective view having parts thereof broken away and in section of an electroformed nickel positive of the nickel negative shown in FIG. 5 according to the present invention.

The nickel negative 50 can be used as a mold to create arrays of concave microlenses, or it can be electroformed in nickel to create a nickel positive 60, shown in FIG. 6. The nickel positive 60 has a plurality of concave surfaces 62 corresponding to the convex surfaces 52 in FIG. 5. The nickel positive 60 can be used in a thermal embossing process to create an array of convex microlenses. Preferred lens forming materials include optical thermoplastics such as polymethylmethacrylate, polycarbonate, polyolefin, cellulose acetate butyrate, and polystyrene. In the alternative, lens forming material may be poured onto the nickel positive 60 and cured. Preferred curable lens forming materials include optically transparent thermosetting resins such as epoxy, optically transparent radiation curable resins, such as acrylate, methacrylate, urethane acrylate, epoxy acrylate, and polyester acrylate, and perhaps glass.

The lens array is then separated from the nickel positive 60. Microlenses formed by the method of the present invention are generally spherical and preferably have a center to center spacing of less than about 2 mm, more preferably less than about 1 mm, and most preferably within the range of from about 0.05 mm to 0.5 mm.

Figure 7:
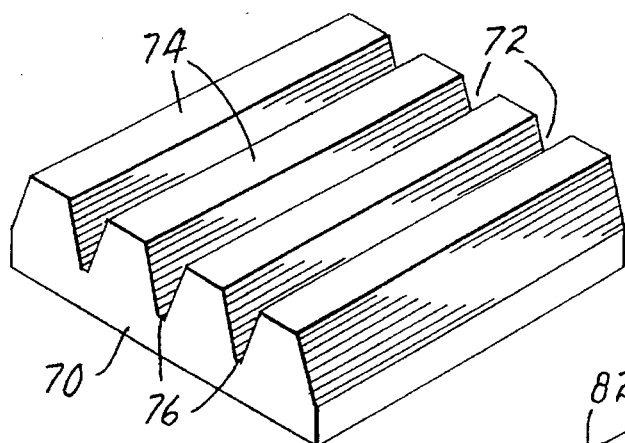
FIG. 7 is a perspective view of a substrate having a first plurality of spaced parallel grooves according to another embodiment of the present invention.
Figure 8:
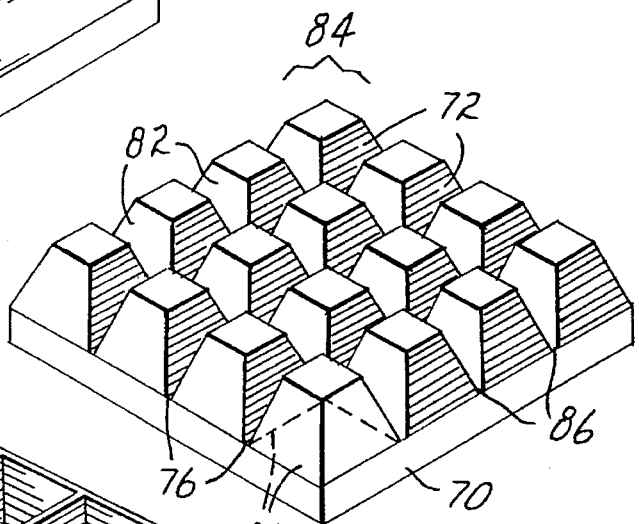
FIG. 8 is a perspective view of the substrate shown in FIG. 7 having a second plurality of spaced parallel groves intersecting the second plurality of grooves.
Figure 9:
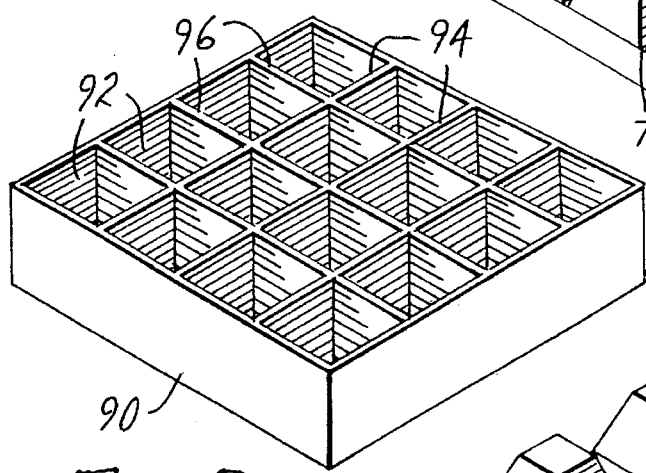
FIG. 9 is a perspective view of a negative replica of the substrate shown in FIG. 8 according to the present invention.

Another embodiment of the present invention is shown in FIGS. 7–9. FIG. 7 shows a substrate 70 having grooves 72. The substrate 70 is preferably made from the same material as the substrate 10, and like the grooves 12, the grooves 72 are preferably, although not necessarily, straight and parallel to each other, and have sharp bottoms 76. The substrate 70 differs from the substrate 10, however, in that the grooves 72 are not immediately adjacent each other but rather are separated from each other, thereby creating flat-topped ridges 74.

A second plurality of grooves 82 is then machined by diamond turning into the substrate 70, as shown in FIG. 8. As in the case of the grooves 72, the grooves 82 are preferably, although not necessarily, straight and parallel to each other, have sharp bottoms 86, and are cut to the same depth as the grooves 72. And as in the case of the grooves 72, the grooves 82 are separated from each other, thereby creating flat-topped pyramidal protrusions 84.

The grooves 82 are preferably perpendicular to the grooves 72. If this is the case, then the protrusions 84 will resemble pyramids having rectangular bases 88 and rectangular flat tops. The grooves 82 may also be non-perpendicular with respect to the grooves 72, and the distance between adjacent grooves 82 and adjacent grooves 72 need not be equal. However, the protrusions 84 will have square bases and square flat tops if the grooves 82 are perpendicular to the grooves 72 and the distance between adjacent grooves 82 and adjacent grooves 72 is equal.

The surface of the substrate 70 having the protrusions 84 is then replicated, preferably by electroforming in nickel to form a negative replica 90 of the substrate, as shown in FIG. 9. The replica 90 has a plurality of flat-bottomed pyramidal receptacles 92, which correspond to the flat-topped pyramidal protrusions 84 shown in FIG. 8. The receptacles 92 have rectangular apertures and are separated by walls 94 and 96, which correspond to the grooves 72 and 82, respectively, shown in FIG. 8.

A hardenable liquid (not shown) may then be applied to the replica 90 in the same manner discussed above with respect to the replica 30. A nickel negative and a nickel positive of the hardened-liquid-covered replica 90 may be made in the same manner discussed above with respect to the nickel negative 50 and the nickel positive 60.

Figure 10:
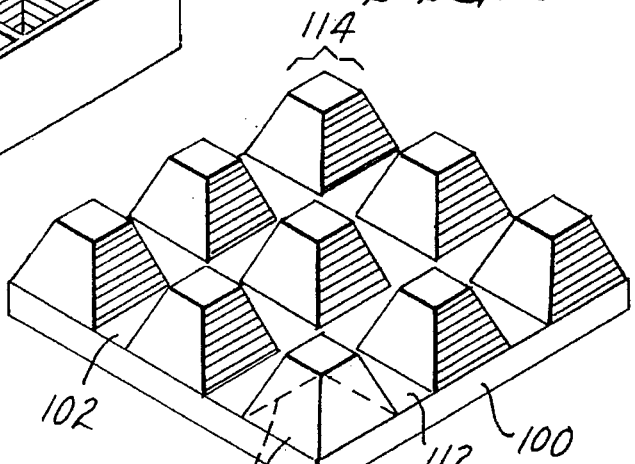
FIG. 10 is a perspective view of a substrate having a first and second plurality of separated, wide, parallel grooves according to yet another embodiment of the present invention.
Figure 11:
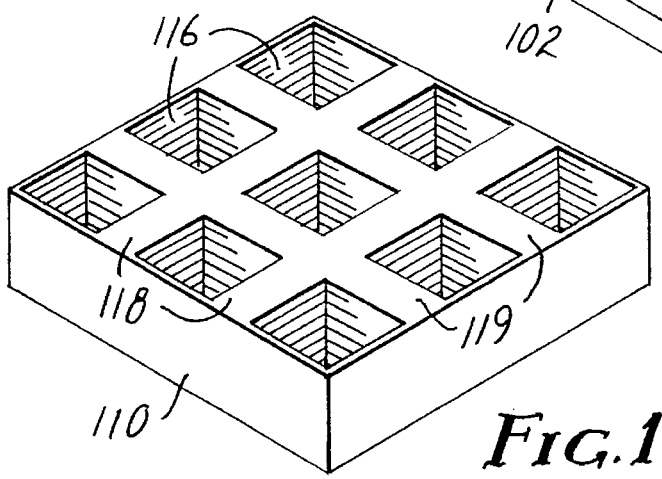
FIG. 11 is a perspective view of a negative replica of the substrate shown in FIG. 10 according to the present invention.

Yet another embodiment of the present invention is shown in FIGS. 10–11. FIG. 10 shows a substrate 100 which is preferably made from the same material as the substrate 70, and, like that substrate, has a plurality of grooves 102 which are preferably, although not necessarily, straight and parallel to each other. The substrate 100 differs from the substrate 70, however, in that the grooves 102 do not have sharp bottoms corresponding to the sharp bottoms 76 shown in FIG. 7, but rather the grooves are wide and have bottoms that are relatively flat.

The substrate 100 also has a plurality of wide grooves 112 which are also preferably, although not necessarily, straight and parallel to each other, and are cut to the same depth as the grooves 102. And as in the case of the grooves 102, the grooves 112 are separated from each other, thereby creating flat-topped pyramidal protrusions 114.

The grooves 112 are preferably perpendicular to the grooves 102. If this is the case, then as was the case with the substrate 70, the protrusions 114 will resemble pyramids having rectangular bases 108 and rectangular flat tops. The grooves 112 may also be non-perpendicular with respect to the grooves 102, and the distance between adjacent grooves 102 and adjacent grooves 112 need not be equal.

The substrate 100 having the protrusions 114 is then replicated, preferably by electroforming in nickel, to form a negative replica 110 of the substrate, as shown in FIG. 11. The replica 110 has a plurality of flat-bottomed pyramidal receptacles 116, which correspond to the flat-topped pyramidal protrusions 114 shown in FIG. 10.

The receptacles 116 have rectangular apertures and are separated by wide walls 118 and 119. The walls 118 and 119 are wider than the walls 94 and 96 of the nickel negative 90 due to the large width of the grooves 102 and 112.

A hardenable liquid (not shown) may then be applied to the replica 110 in the same manner discussed above with respect to the replica 30. A nickel negative and a nickel positive of the hardened-liquid-covered replica 110 may be made in the same manner discussed above with respect to the nickel negative 50 and the nickel positive 60.

Figure 13:
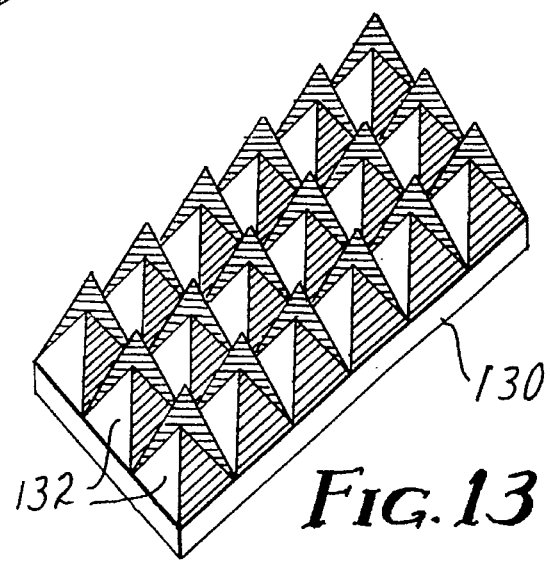
FIG. 13 is a perspective view of a substrate having three pluralities of intersecting grooves according to yet another embodiment of the present invention.

The method of the present invention can also be used to generate generally spherical microlenses lenses having a generally triangular perimeter by providing three pluralities of intersecting grooves in a substrate 130 as shown in FIG. 13. The third plurality of grooves should be cut to the same depth as the first two pluralities of grooves and should pass through the points of intersection of the first two pluralities of grooves. This third set of grooves creates tetrahedral protrusions 132, i.e., a three sided protrusion having a triangular base.

If the second plurality of parallel grooves is rotated by 60° with respect to the first plurality of parallel grooves, and if the spacing between adjacent grooves in the first plurality of parallel grooves is equal to the spacing in the second plurality of parallel grooves, then, after the third plurality of grooves is provided passing through the intersection of the first two pluralities of parallel grooves, the tetrahedral protrusions 132 generated will have three isosceles triangular faces and an equilateral triangular base.

Figure 14:
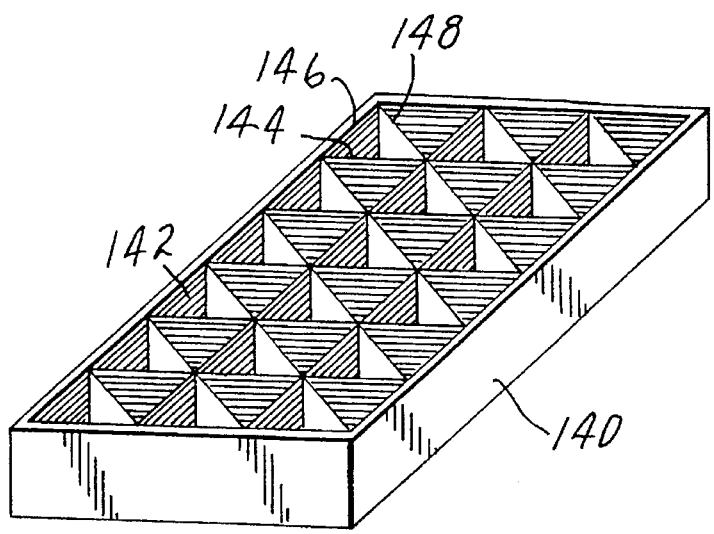
FIG. 14 is a perspective view of a negative replica of the substrate shown in FIG. 13 according to the present invention.

The substrate 130 having the protrusions 132 is then replicated, preferably by electroforming in nickel, to form a negative replica 140 of the substrate, as shown in FIG. 14. The replica 140 has a plurality of tetrahedral receptacles 142, which correspond to the tetrahedral protrusions 132 shown in FIG. 13. The tetrahedral receptacles 142 have triangular apertures and are separated by walls 144, 146, and 148. As was the case with the previous embodiments, the size, shape, and separation of the grooves can be altered to make sharp or wide-topped walls 144, 146, and 148 and pointed or flat-bottomed receptacles 142.

A hardenable liquid (not shown) may then be applied to the replica 140 in the same manner discussed above with respect to the replica 30. Further negative and positive replicas may be made in the same manner discussed above.

Optionally, receptacle apertures having more than four sides can be formed by known processes such as photolithography or knurling.

The lenses that are formed by the method of the present invention perform very well as spherical lenses near their centers. However, the formed lenses behave increasingly less like spherical lenses towards their perimeters. This is because the walls forming the perimeter of the individual lenses are straight and lie in a common plane, thereby forcing the lens forming meniscus surface to deviate from a spherical shape. The amount of the error for a given square lens increases as the lens radius is made smaller.

Figure 12:
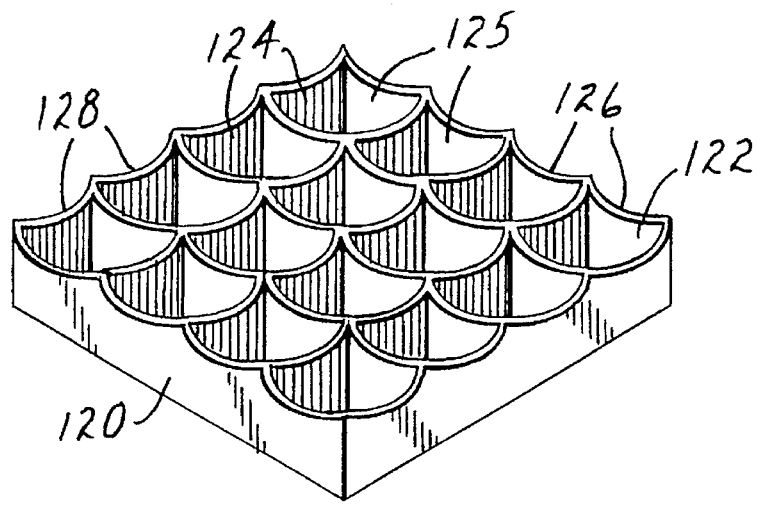
FIG. 12 is a perspective view of the replica shown in FIG. 9 having arcuate grooves in the raised walls according to another embodiment of the present invention.

This error may be minimized by providing arcuate grooves in the replicas 30, 90, 110, and 140 before the resin is applied to their surfaces. A negative replica 120 having these additional grooves is shown in FIG. 12.

The replica 120 should be made of a material that is susceptible to diamond machining. Such materials include hard copper and epoxy and acrylic polymers. Nickel is too tough to be machined accurately. If the replicas 30, 90, 110, and 140 are made of nickel, they should first be replicated in a material more susceptible to diamond machining. Before the arcuate grooves are machined into the replica 120, the plane formed by the tops of the walls on the replica should be extremely flat, e.g., within 1.5 μm. The receptacles may be filled with lacquer or similar removable material to support the walls during this additional cutting process. The diamond cutting tools used to make the arcuate grooves should have a cutting edge having a profile corresponding to the desired curvature of the arcuate grooves. The replica 120 may then be replicated in a hard substance, such as nickel, as desired.

The replica 120 has receptacles 122 formed by walls 124 and 125. The walls 124 and 125 of the replica 120 have a plurality of arcuate grooves 126 and 128. The arcuate grooves 126 are parallel to the walls 124, which resulted from the formation of the negative replica of the first plurality of parallel grooves 72 in the substrate 70 shown in FIG. 7. Each arcuate groove 126 is centered between each pair of walls 124. The width of each arcuate groove 126 preferably spans the entire distance between each pair of walls 124, which corresponds to the distance between the grooves 72. Consequently, the arcuate grooves 126 are straight and parallel to the same extent that the grooves 72 are straight and parallel.

The arcuate grooves 128 are parallel to the walls 125 which resulted from the formation of the negative replica of the second plurality of parallel grooves 82 in the substrate 70 shown in FIG. 8. Each arcuate groove 128 is centered between each pair of walls 125. Each arcuate groove 128 preferably spans the entire distance between each pair of walls 125, which corresponds to the distance between the grooves 82. The arcuate grooves 128 are straight and parallel to the same extent that the grooves 82 are. The arcuate grooves 128 will be perpendicular to the arcuate grooves 126 if the grooves 82 are perpendicular to the grooves 72.

The use of the arcuate grooves as a correction mechanism is based on the assumption that the distance between the geometric center of the receptacle aperture and a corner of that receptacle is the same for each corner of the receptacle. This is true for receptacles having apertures that are in the shape of squares, rectangles, equilateral triangles, and other regular polygons, such as equilateral hexagons, but is not true of rhombuses, parallelograms, and other irregular polygons.

The precise shape of the arcuate grooves used to enhance lens sphericity near the lens perimeter is defined by the projection of the intersection of the desired spherical lens surface with the receptacle wall into a plane which has its surface normal oriented parallel to the lengths of the arcuate grooves. A diamond tool with an elliptical profile may cut such grooves.

Figure 15:
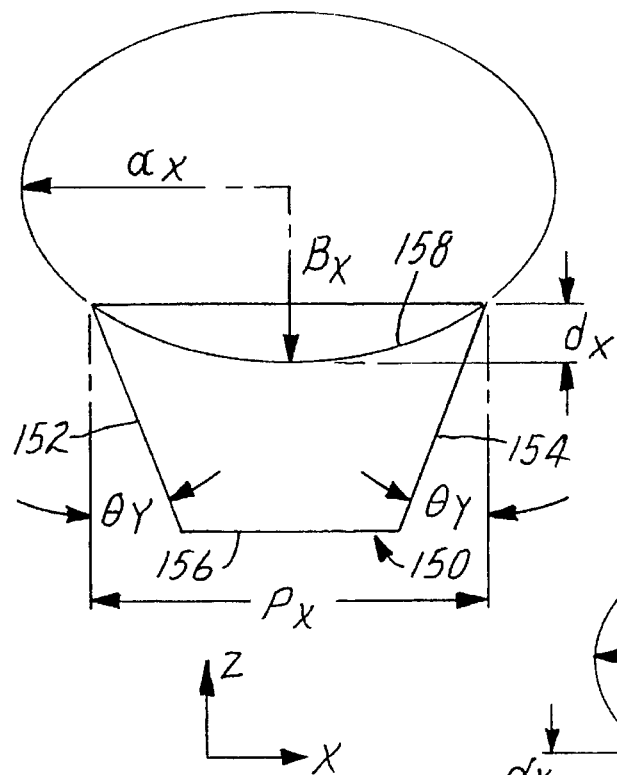
FIGS. 15 and 16 are perpendicular cross-sectional side views of a receptacle according to the present invention.
Figure 16:
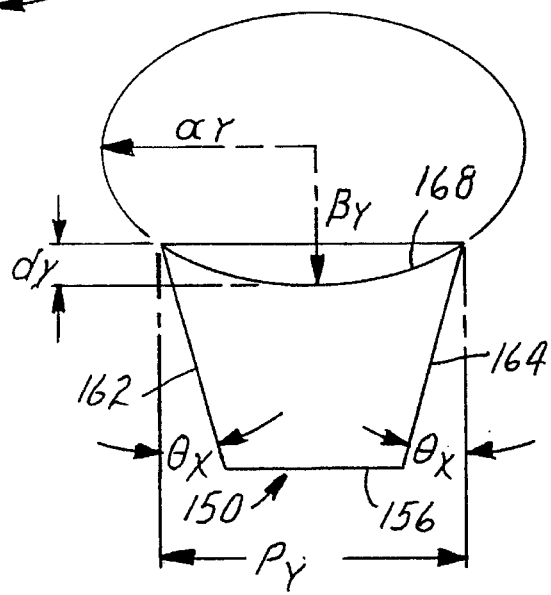

Perpendicular cross-sections of a receptacle 150 are shown in FIGS. 15 and 16. The receptacle 150 is defined by opposing walls 152 and 154 and opposing walls 162 and 164 and has a rectangular aperture having length $P_x$ and width $P_y$. Each of the opposing walls 152 and 154 converge toward each other at an angle of $\theta_y$ from the vertical as they approach the base 156 of the receptacle 150, as shown in FIG. 15. Similarly, the opposing walls 162 and 164 converge toward each other at an angle of $\theta_x$ from the vertical as they approach the base 156 of the receptacle 150, as shown in FIG. 16.

The equation for determining the appropriate profile of the arcuate grooves is a function of the length $P_x$ and width $P_y$ of the receptacle 150, the angles $\theta_x$ and $\theta_y$, and the desired lens sphere radius, $R_s$, of the desired lens. For the arcuate grooves cut into the walls 162 and 164, this profile is a portion of an ellipse 158 that intersects the tops of the walls 152 and 154, as shown in FIG. 15. The ellipse 158 has a semi-major axis $\alpha_x$ and a semi-minor axis $\beta_x$, and cuts into the walls 162 and 164 to a depth $d_x$ at the center of the walls. The arcuate groove that spans the receptacle 150 in the X-direction can be cut with a diamond tool that has the profile of the ellipse 158. The ellipse 158 is defined by the equation:

$$\alpha_x = \sqrt{R_S^2 - \left(\frac{P_x}{2}\cos\theta_x + \sqrt{R_S^2 - \frac{P_x^2 + P_y^2}{4}}\sin\theta_x\right)^2}$$

$$\beta_x = \alpha_x \cos\theta_x.$$

The tool will have its semi-major axis $\alpha_x$ parallel to the x direction, cut in the y direction, centered between the receptacle walls 152 and 154, and make a cut of depth, $d_x$, where $$d_x = \beta_x + \frac{P_x}{2}\sin\theta_x\cos\theta_x - \sqrt{R_S^2 - \frac{P_x^2 + P_y^2}{4}}\cos^2\theta_x$$

For the arcuate grooves cut into the walls 152 and 154, the profile of the arcuate grooves is a portion of an ellipse 168 that intersects the tops of the walls and 164, as shown in FIG. 16. The ellipse 168 has a semi-major axis $\alpha_y$ and a semi-minor axis $\beta_y$, and cuts into the walls 152 and 154 to a depth $d_y$ at the center of the walls.

The arcuate groove that spans the receptacle in the y direction may be cut in a similar fashion with a diamond tool that has the profile of the ellipse 168. The ellipse 168 is defined by the equation:

$$\alpha_y = \sqrt{R_S^2 - \left(\frac{P_y}{2}\cos\theta_y + \sqrt{R_S^2 - \frac{P_x^2 + P_y^2}{4}}\sin\theta_y\right)^2}$$

$$\beta_y = \alpha_y \cos\theta_y.$$

The tool will make a cut of depth, $d_y$, where $$d_y = \beta_y + \frac{P_y}{2}\sin\theta_y\cos\theta_y - \sqrt{R_S^2 - \frac{P_x^2 + P_y^2}{4}}\cos^2\theta_y$$

If the receptacle 150 were shaped like a square instead of a rectangle, (i.e., $P = P_x = P_y$), and assuming therefore that $\theta = \theta_x = \theta_y$, the equations for $\alpha$, $\beta$, and d would become:

$$\alpha = \alpha_x = \alpha_y = \sqrt{R_S^2 - \left(\frac{P}{2}\cos\theta + \sqrt{R_S^2 - \frac{P^2}{2}}\sin\theta\right)^2}$$

$$\beta = \beta_x = \beta_y = \alpha\cos\theta$$

$$d = d_x = d_y = \beta + \frac{P}{2}\sin\theta\cos\theta - \sqrt{R_S^2 - \frac{P^2}{2}}\cos^2\theta$$

If the aperture of the receptacle 150 were square-shaped and further had walls 152, 154, 162, and 164 which were vertical, then $\theta = 0$ and (because $\cos\theta = 1$ and $\sin\theta = 0$), $\alpha$ becomes equal to $\beta$, and the ellipse becomes a circle having a radius given by:

$$r = \alpha = \beta = \sqrt{R_S^2 - \frac{P^2}{4}}$$

The depth d therefore becomes:

$$d = r - \sqrt{R_S^2 - \frac{P^2}{2}}$$

Figure 17:
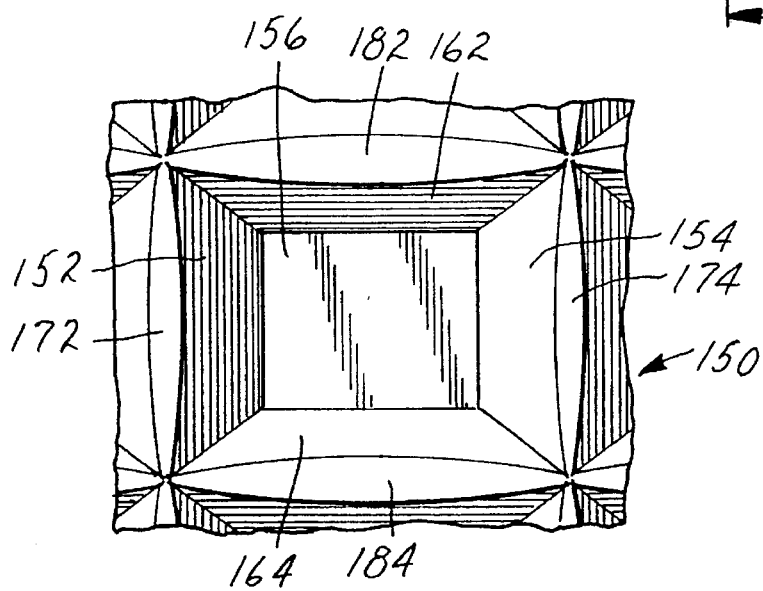
FIG. 17 is an overhead view of the receptacle shown in FIGS. 15 and 16.

An overhead view of the receptacle 150 that results from cutting the arcuate grooves into the receptacle is shown in FIG. 17. The receptacle 150 has football-shaped areas 172, 174, 182, and 184 at the tops of the walls 152, 154, 162, and 164, respectively. The football-shaped areas 172, 174, 182, and 184 result from the fact that the walls 152, 154, 162, and 164 are not vertical, but rather they get fatter towards the base 156 of the receptacle 150. Thus the football-shaped areas 172, 174, 182, and 184 are wider at their centers because that is where the arcuate grooves are the deepest. The football-shaped areas 172, 174, 182, and 184 are defined by two symmetrical elliptical arcs, the ends of which terminate at the corners of the aperture of the receptacle 150. The middle of each arc curves toward the center of the aperture of the receptacle 150. The length of the area bounded by the elliptical arcs is large compared with its width. The length of the area is perpendicular to the direction of separation of adjacent microlenses.

If the arcuate grooves were cut into the walls defining receptacle apertures in the shape of equilateral triangles, equilateral hexagons, etc., the perimeter of the receptacle aperture would be a modified polygon in that each edge of the aperture would be an elliptical arc, the ends of which terminate at the corners of the polygon, where the middle of the arc curves toward the center of the aperture. Thus, a microlens array mold having the receptacles 150 would include a two-dimensional array of concave surfaces capable of forming a plurality of convex microlenses. Each concave surface would have a perimeter of the modified polygon described above. Similarly, microlenses made from this mold would also have the same perimeter.

Although the present invention has been described with reference to preferred embodiments, workers skilled in the art will recognize that changes may be made in form and detail without departing from the spirit and scope of the invention.

We claim:

1. An array of microlenses, wherein the perimeter of each microlens is a modified polygon in that each edge of the lens approximates an elliptical arc, the ends of which terminate at the corners of the polygon, wherein the middle of the arc curves toward the center of the microlens.

2. The array of claim 1 wherein the polygon is a triangle.

3. The array of claim 1 wherein the polygon is a rectangle, and wherein each edge of the lens is a symmetrical elliptical arc.

4. The array of claim 1, wherein the microlenses are spherical microlenses.

5. The array of claim 1, wherein each microlens is separated from each neighboring microlens by a football-shaped area, the length of the football-shaped area being perpendicular to the direction of separation of neighboring microlenses.

6. The array of claim 1, wherein the microlenses are of equal size.

7. The array of claim 1, wherein the microlenses have a center-to-center spacing within the range from 0.05 to 0.5 mm.

8. The array of claim 7, wherein the center-to-center spacing is constant throughout the array.

* * * * *